Figure 1:
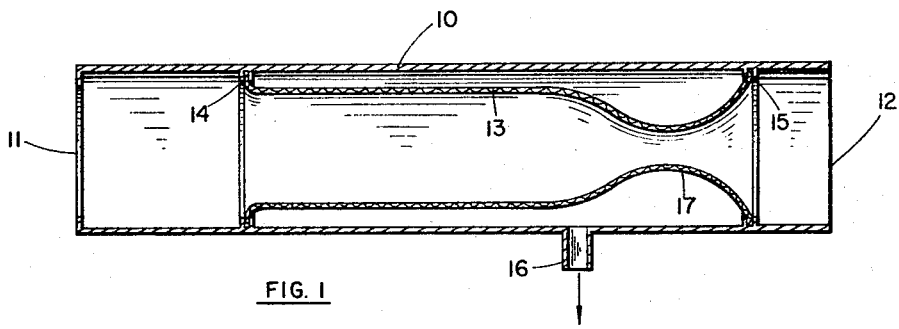

Aug. 9, 1966  D. H. ELLIOTT  3,265,090
FLUID FLOW CONTROLLER
Filed Nov. 9, 1962  2 Sheets-Sheet 1

INVENTOR.
DEAN H. ELLIOTT
BY *Rolf M. Pitts*

ATTORNEY

Aug. 9, 1966  D. H. ELLIOTT  3,265,090
FLUID FLOW CONTROLLER

Filed Nov. 9, 1962  2 Sheets-Sheet 2

INVENTOR.
DEAN H. ELLIOTT
BY Roef M. Pitts

ATTORNEY

United States Patent Office 3,265,090
Patented August 9, 1966

3,265,090
FLUID FLOW CONTROLLER
Dean H. Elliott, Garden Grove, Calif., assignor to North American Aviation, Inc.
Filed Nov. 9, 1962, Ser. No. 236,578
1 Claim. (Cl. 138—45)

This invention relates to a fluid flow controller, and more particularly a controller using venturi means constructed of non-resilient material for providing flow control as a function of a control or reference pressure.

In the prior art, the control of fluid flow as a function of a control or reference pressure has employed combinations of spring-loaded linkages, and elastomeric or resilient pressure-responsive devices for throttling and regulating the flow of a fluid. Such devices are bulky, and are therefore not suited to installation in an airplane or missile for an airborne application. Also, such linkages and spring-loaded or elastic devices are difficult to adjust and are sensitive to accelerations and vibration environments, as to preclude their proper performance in an airborne environment. Further, such use of elastic and resilient elements provides an inherent time-constant or time-delay which limits the dynamic performance of such devices in response to rapid changes of fluid flow and control pressure. Such time-delay results from "ballooning" of the elastic elements in response to a pressure-differential, which ballooning also limits the maximum useful pressure range over which such devices may be successfully employed. Further, the spring loading of mechanical linkage type devices, necessary for pre-loading out mechanical backlash or "free-play," provides a force threshold below which the devices will not respond.

The concept of the invention provides a small, convenient device adaptable for use in airborne fluid control applications. Further, the device avoids the use of spring-loaded elements and resilient pressure-responsive elements, to provide improved dynamic response, lower threshold, and improved reliability.

In a preferred embodiment of the subject invention, there is provided a conduit member for the fluid whose flow is desired to be controlled. There is also provided a deformable and non-resilient member mounted within the rigid conduit member providing a deformable, non-resilient conduit for fluid communication between the openings in the rigid member. There is further provided means for applying a source of fluid pressure to the deformable member, whereby the fluid communication between the egress and ingress openings is controlled as a function of the applied control pressure.

In normal operation of the above described device it has been discovered that fluid flow is maintained substantially constant over a wide range of pressure drops between the load and the supply source, in response to the venturi action caused by a given pressure difference between the control pressure and the supply pressure. Such performance is obtained by utilizing a non-resilient, non-elastic venturi structure which prevents the ballooning associated with elastomer elements when subjected to substantial pressure drops.

Accordingly, it is a general object of the subject invention to provide non-resilient means for controlling the flow of fluid.

It is another object of the subject invention to provide reliable fluid control as a function of a control pressure over a wide range of pressure drops.

It is yet another object of the subject invention to provide reliable flow control of a fluid by venturi means which is responsive to both the pressure of said fluid and a control pressure.

Figure 3:
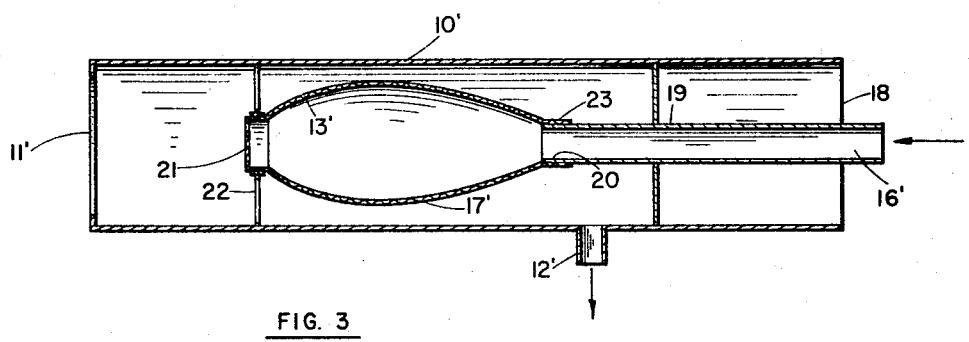
Figure 2:
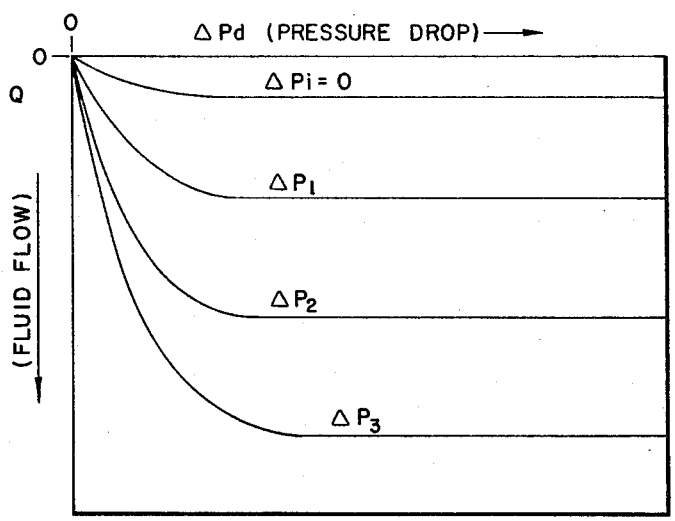
Figure 4:
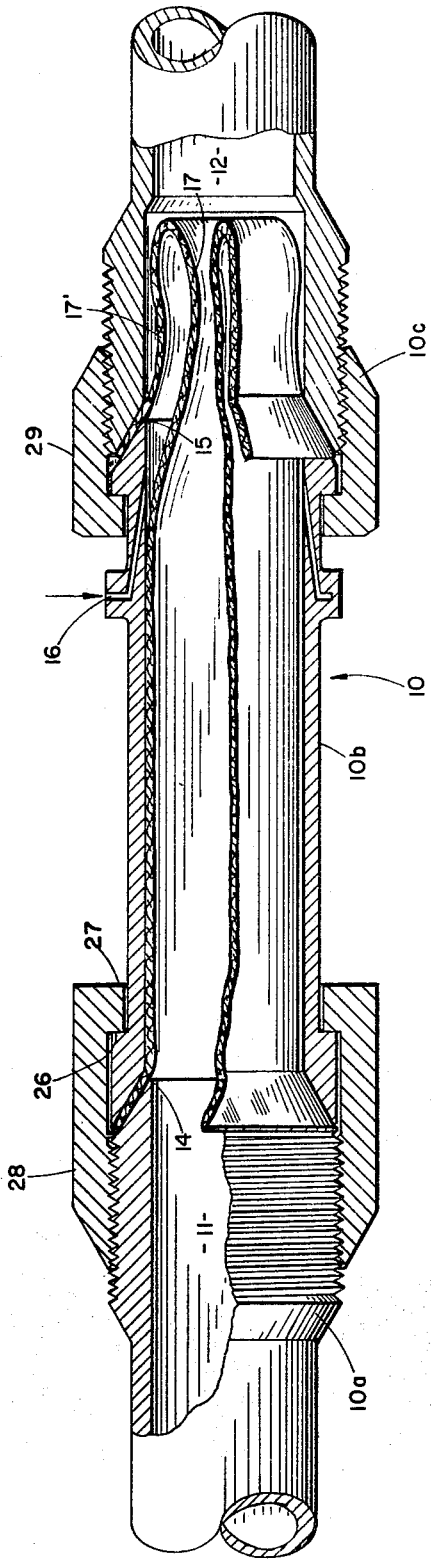

These and other objects of the subject invention will become apparent from the following description taken together with the accompanying figures in which:

FIG. 1 is a simplified diagram of one embodiment of the principle of the invention;
FIG. 2 is a diagram of flow curves of the device of FIG. 1 for a family of control pressures;
FIG. 3 is a simplified diagram of an alternate embodiment of the principle of the invention; and
FIG. 4 is a center section of a preferred embodiment of the invention.

In the drawings, like reference characters refer to like parts.

The concept of the invention involves a continuous process of fluid dynamics. A fluid under pressure always seeks a condition of lower energy level. In so doing, fluid movement will be substituted for pressure. The velocity attained by such movement is expressed by the equation:

$$V = \sqrt{\frac{2\Delta P_g}{d}} \quad (1)$$

where:
$V$ = velocity in feet per second
$\Delta P$ = pressure drop in pounds per square foot
$g$ = gravitational constant in feet per second squared
$d$ = fluid density in pounds per cubic feet.

Such equation does not include the effect of friction.

When a confined fluid under static pressure is allowed to accelerate through a tube to a given velocity, a loss, along the tube, in internal pressure ($\Delta P_d$) results. Such effect is the venturi effect. If a readily deformable tube is used to convey the fluid, such tube will tend to collapse under an externally applied control pressure equal, say, to the fluid supply pressure. The higher the velocity of the accelerating or escaping fluid, the more its pressure drops and the more the tube collapses until a balance is reached between the internal venturi action and the external control pressures acting on the tube. Associated with the collapse of the tube is a decreased mass transfer or decreased fluid flow through the tube, due to the restricted cross-section of the collapsed tube.

If the externally applied control pressure is decreased, a new force balance on the walls of the tube will result, and expansion of the tube occurs until the tube cross-section provides a lesser internally generated pressure (due to the venturi effect) which equals the decreased control pressure. An increase in fluid flow through the tube is associated with this expansion of the tube. Hence, flow through the deformable tube is decreased as the difference between the supply pressure and the control pressure decreases (e.g., control pressure is increased); and such flow is increased as the difference between the supply pressure and the control pressure is increased (e.g., control pressure decreases).

A simplified diagram of a device incorporating the concept of the invention is shown in FIG. 1.

Referring to FIG. 1, there is illustrated an exemplary embodiment of the concept of the invention. There is provided a rigid conduit member or tube 10 having ingress and egress openings 11 and 12 therein, adapted to be inserted in a fluid circuit whose fluid flow is desired to be regulated. There is also provided a readily deformable inelastic hollow tubular member or sleeve 13 coaxially mounted within rigid hollow tube 10. Axial ends 14 and 15 of deformable sleeve 13 are fixed to the internal sides of rigid tube 10, whereby the interior of deformable sleeve 13 provides a sealed, deformable conduit for fluid communication between openings 11 and 12 of rigid member 10. The distance between such ends 14 and 15, as measured along rigid member 10, is limited relative to the length of sleeve 13 so as to allow a pinching-off of sleeve 13 in response to an externally applied net pressure.

For the control of non-corrosive oils and similar fluids, the material of which deformable sleeve 13 is fabricated may comprise a multi-ply nylon or the like. The material used should be preferably nonpermeable to the pressurized fluids to which it is exposed. For this reason, the fabric may be impregnated with any suitable deformable sealant, such as rubber or an elastic plastic. It is to be understood that the function of such impregnation of the deformable material is to provide non-permeability to fluids while retaining the deformable property of the fabric, and not to provide an elastomeric property in the sleeve.

There is further provided a control pressure port 16 located in the wall of rigid tube 10 between the ends 14 and 15, and adapted for porting or subjecting the external sides of deformable sleeve 13 to a source of control pressure.

In normal operation of the device of FIG. 1, fluid flow from opening 11 to opening 12 via sleeve 13 is made to occur in response to the application of a source of pressurized fluid at ingress opening 11. The application of a source of control pressure at port 16 produces a pinching action upon deformable sleeve 13, resulting in a constriction or venturi throat at a cross-section 17 of sleeve 13, thereby restricting the flow of fluid through sleeve 13. The actual shape assumed by sleeve 13 is determined by the control pressure, the pressure in the fluid flowing through sleeve 13, and the impingement of the mass flow upon the inside wall or sides of sleeve 13. Such mass flow through the device of FIG. 1 produces a pressure drop across, or pressure differential between, openings 11 and 12. Over a wide range of values of such pressure drop $\Delta P_d$, an almost constant flow rate Q will be maintained for a given difference $\Delta P_i$ between control pressure $P_c$ and the supply pressure $P_s$, as shown in FIG. 2.

Referring to FIG. 2, there is illustrated a family of idealized flow curves of Q plotted versus pressure drop $\Delta P_d$ for several values of difference ($\Delta P_i$) between control pressure $P_c$ and supply pressure $P_s$. The straight horizontal portion of each curve of the family of curves illustrates that for a wide range of pressure drops $\Delta P_d$, an almost constant flow Q is maintained for a given difference $\Delta P_i$ between the supply pressure and control pressure. The notations $\Delta P_1$, $\Delta P_2$ and $\Delta P_3$ indicate successively increasing values of $\Delta P_i$. As the difference $\Delta P_i$ between the supply pressure and the control pressure increases (e.g., as the control pressure approaches zero pressure), the venturi action is relieved in that the constriction of the throat 17 on sleeve 13 in FIG. 1 increases in cross-section, thereby increasing the fluid flow therethrough. As the difference $\Delta P_i$ between the supply pressure and the controlled pressure reduces toward zero (e.g., control pressure approaches the supply pressure), the throat 17 of sleeve 13 in FIG. 1 tends to become pinched off, thereby reducing the flow through sleeve 13.

While the invention has been illustrated in FIG. 1, in an embodiment of a device for the control of fluid through a deformable sleeve, the concept of the invention is not thus limited. It is to be understood that the principle of the invention is equally applicable to the control of confined fluids flowing around a deformable member, as shown in FIG. 3.

Referring to FIG. 3, there is illustrated an alternate embodiment of the concept of the invention. There is provided a rigid conduit member or rigid hollow tube 10' having an opening 11' at one end thereof, and another opening 12' in the side or wall of tube 10' and axially displaced from opening 11'. A second axial end of rigid conduit member 10' is enclosed by means of a rigid end cap 18. End cap 18 is pierced by a second rigid conduit member 19, which is rigidly and sealingly fastened to end cap 18. Conduit member 19 has two egress and ingress openings 20 and 16', a first opening 20 being internal to first rigid conduit 10', and a second opening 16' being external to first rigid conduit 10' and forming a control pressure port.

A deformable hollow tubular member or sleeve 13' is coaxially mounted within rigid member 10' within the axial extent of the axial displacement of opening 12' relative to opening 11'. One axial end 21 of the deformable sleeve 13' is sealingly closed and supported within rigid conduit 10' by means of a support member 22 mechanically interconnecting axial end 21 and member 10'. The other axial end or mouth 23 of sleeve 13' is sealingly connected to hollow tube 19 so as to provide fluid pressure communication between the interior cavity of sleeve 13' and control pressure port 16'. Hence, the interior cavity formed by enclosed conduit 10' and exterior to deformable sleeve 13' (and to that portion of tube 19 contained within conduit 10') comprises a deformable chamber providing fluid communication between openings 11' and 12'.

In normal operation of the device of FIG. 3, egress and ingress openings 11' and 12' are inserted in fluid circuit with a confined pressurized fluid whose flow is to be controlled, and control pressure port 16' is connected to a source of control pressure. The application of a source of control pressure to port 16' causes the deformable sleeve 13' to deform or inflate, whereby a construction or venturi throat 17' is formed between the outside of deformable sleeve 13' and the inside of rigid member 10'. This constriction restricts the mass flow of fluid between egress and ingress openings 11' and 12'. A change in constriction and a consequent change in mass flow results in response to a change in control pressure, and in a like manner as is described for the device of FIG. 1 and illustrated in FIG. 2.

An embodiment of the invention is shown in FIG. 4, illustrating the means of securing the deformable member to the inside of the rigid member.

Referring to FIG. 4 there is illustrated a preferred embodiment of the device of FIG. 1. There is provided a hollow cylindrical rigid assembly 10 comprising two terminal sections 10a and 10c, and a center section 10b. Each rigid section of assembly 10 is adapted to matingly engage an adjacent section. For example, that end of section 10a adjacent center section 10b is tapered, and the corresponding end of center section 10b is matingly shaped whereby section 10a and center section 10b are adapted to matingly engage as respective male and female fittings.

That end of center section 10b adjacent and section 10c is tapered, and the corresponding end of rigid section 10b is matingly shaped whereby center section 10b and section 10c are adapted to matingly engage as respective male and female fittings.

A raised shoulder 26 is provided at each end of center section 10b for engaging the collar 27 of an externally concentric coupling member 28 and 29 mounted thereon. Each of end sections 10a and 10c is externally threaded as a male threaded member, and corresponding coupling members 28 and 29 are internally threaded as respective female threaded members for matingly engaging threaded end sections 10a and 10c respectively. In this way, center section 10b is urged by coupling members 28 and 29 to engage end sections 10a and 10c, respectively, whereby a rigid assembly is formed. A control pressure port and associated orifice are included in center section 10b for providing fluid communication in the same manner as the like referenced element of FIG. 1.

The deformable member 13, is made so as to permit the venturi end 17' to be peeled or pulled back over the member itself. The ends 14 and 15 each form a flared skirt for fitting over the male engaging ends of section 10a and 10b, respectively. The skirted end sections 14 and 15 of deformable member 13 are thus engaged between mating ends of center section 10b and an adjacent rigid end section, whereby the ends of deformable member 13 are secured to the interior of rigid assembly 10. The flared skirt section 14 and 15 so secured between mating ends of the section of rigid assembly 10 also provide means for sealing the rigid joints formed by the matingly engaged rigid sections.

The concept of the invention is adapted, for example, to regulation of hypergolic fluid flow in liquid rocket engines, wherein optimum performance requires a proper mix or flow ratio of the component fluids by controlling the mass flow rate of one such fluid as a function of the other. The material used for sealing the deformable non-resilient member is somewhat dependent upon the type of fluids between which a flow ratio is being maintained since such material must be effectively inert and unaffected by exposure to such fluids.

In a hypergolic rocket engine, employing the device of the subject invention, continuously variable engine thrust control is possible by controlling the pressure of only one of the fluids. Controlling the pressure of one of the fluids conventionally controls its mass flow, while use of that pressure may be used as control pressure by the subject invention to govern the flow of the second fluid. In this way, conventional pressure control of one fluid controls the mass flow of both fluids to provide continuous thrust control of the thrust developed by the hypergolic fluid mixture.

Hence, it is to be appreciated that efficient and reliable means is provided for the useful regulation of fluid mass flow.

Although the invention has been described and illustrated in detail, it is to be clearly understood that the same is by way of illustration and example only and is not to be taken by way of limitation, the spirit and scope of this invention being limited only by the terms of the appended claim.

I claim:

A device for controlling fluid flow as a function of a control pressure comprising:

a hollow cylindrical rigid assembly comprising a first and second terminal section and a central section, each said rigid section adapted to matingly engage an adjacent section as tapered male and female fittings, a raised shoulder being provided at each axial end of said central section and mounting an externally concentric female-threaded coupling member thereon, and said terminal sections being threaded as male-threaded members for matingly engaging a respective one of said female-threaded coupling members; and a deformable and substantially nonresilient hollow tubular member having a flared skirt at the axial extremities thereof and mounted upon a corresponding one of said tapered male fittings as to be sealingly interposed between said matingly engaged adjacent sections of said rigid assembly, said deformable member having an axial extent relative to said rigid assembly whereby one end of said deformable member is peeled back over a portion of said deformable member to define a venturi section thereof, said female-threaded coupling members engaging respective ones of said threaded terminal sections for urging said terminal sections into engagement with said central section, whereby said deformable member is coaxially mounted within said rigid assembly to provide fluid communication between the the terminal sections of said rigid assembly through the interior of said deformable member, said central section of said rigid assembly having a port located within the axial extent thereof and adapted for porting the external sides of said deformable member to a source of control pressure, whereby the venturi section of said deformable member may become pinched-off in response to an externally applied net pressure.

References Cited by the Examiner

UNITED STATES PATENTS

| | | | |
|---|---|---|---|
| 1,873,138 | 8/1932 | Mitchell | 251—5 X |
| 2,687,145 | 8/1954 | Carter | 251—61 X |
| 2,735,642 | 2/1956 | Norman | 103—148 X |
| 2,766,765 | 10/1956 | Bolanowski | 251—5 X |
| 3,039,733 | 6/1962 | Mattioli | 251—5 X |
| 3,078,675 | 2/1963 | Baldwin | 251—5 X |
| 3,092,144 | 6/1963 | Green | 251—5 X |

FOREIGN PATENTS 629,964   10/1961   Canada.

WILLIAM F. O'DEA, *Primary Examiner.*

ISADOR WEIL, *Examiner.*

R. GERARD, *Assistant Examiner.*